United States Patent
Yang et al.

(10) Patent No.: US 12,177,666 B2
(45) Date of Patent: Dec. 24, 2024

(54) ENHANCEMENT OF AUTHENTICATION

(71) Applicant: Telefonaktiebolaget LM Ericsson (publ), Stockholm (SE)

(72) Inventors: Chenyi Yang, Guangzhou (CN); Zhiming Deng, Guangzhou (CN); Hualiang Deng, Guangzhou (CN); Mengjie Zhang, Guangzhou (CN); Wu Chunlan, Guangzhou (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 385 days.

(21) Appl. No.: 17/782,072

(22) PCT Filed: Nov. 3, 2020

(86) PCT No.: PCT/EP2020/080832
§ 371 (c)(1),
(2) Date: Jun. 2, 2022

(87) PCT Pub. No.: WO2021/115686
PCT Pub. Date: Jun. 17, 2021

(65) Prior Publication Data
US 2023/0007481 A1    Jan. 5, 2023

(51) Int. Cl.
*H04W 12/069* (2021.01)
*H04W 12/041* (2021.01)

(52) U.S. Cl.
CPC ....... *H04W 12/069* (2021.01); *H04W 12/041* (2021.01)

(58) Field of Classification Search
CPC .... H04W 12/069; H04W 12/041; H04L 63/08
(Continued)

(56) References Cited

U.S. PATENT DOCUMENTS

| | | | |
|---|---|---|---|
| 8,261,078 B2 * | 9/2012 | Barriga | H04L 63/062 713/153 |
| 2019/0349764 A1 * | 11/2019 | Suh | H04L 9/0838 |

FOREIGN PATENT DOCUMENTS

| | | | | |
|---|---|---|---|---|
| CA | 2965119 A1 * | 5/2015 | | G06F 21/35 |
| CA | 2969829 A1 * | 6/2015 | | H04B 1/3816 |
| EP | 3576443 A1 * | 12/2019 | | H04W 12/001 |

OTHER PUBLICATIONS

International Search Report and the Written Opinion of the International Searching Authority, issued in corresponding International Application No. PCT/EP2020/080832, dated Jan. 29, 2021, 14 pages.

(Continued)

*Primary Examiner* — Tanmay K Shah
(74) *Attorney, Agent, or Firm* — Rothwell, Figg, Ernst & Manbeck, P.C.

(57) ABSTRACT

Methods and apparatus for enhancement of authentication. A method performed by a communication device may comprise sending a first request to a communication equipment, wherein the request comprises a communication device identifier of the communication device. The method may further comprise receiving a first response from the communication equipment, the first response comprising one or more parameters. The method may further comprise generating a first key and a second key based on the received response; The method may further comprise sending a second request to the communication equipment, the second request comprising the first key and a message based on the second key.

20 Claims, 7 Drawing Sheets

(58) Field of Classification Search
USPC .......................................................... 455/411
See application file for complete search history.

(56) References Cited

OTHER PUBLICATIONS

Niemi et al. "Hypertext Transfer Protocol (HTTP) Digest Authentication Using Authentication and Key Agreement (AKA)" RFC 3310, Network Working Group, Sep. 2002, 19 pages.
5G; Security architecture and procedures for 5G System (3GPP TS 33.501 version 15.5.0 Release 15), ETSI Technical Specification, Jul. 2, 2019 European Telecommunications Standards Institute (ETSI), 650, route des Lucioles; F-06921 Sophia-Antipolis, France, (Jul. 2019), 3GPP SA, V15.5.0, pp. 1-194.
Franks et al. "HTTP Authentication: Basic and Digest Access Authentication" Network Working Group Request for Comments: 2617, Jun. 1999, 34 pages.
3GPP ETSI TS 133 102 V15.1.0(Apr. 2019) "Digital cellular telecommunications system (Phase 2+) (GSM); Universal Mobile Telecommunications System (UMTS); 3G security" Security architecture (3GPP TS 33.102 version 151.0 (Release 15), Global System for Mobile Communications, 13 pages.

* cited by examiner

ENHANCEMENT OF AUTHENTICATION

CROSS REFERENCE TO RELATED APPLICATION(S)

This application is a 35 U.S.C. § 371 National Phase Entry Application from PCT/EP2020/080832, filed Nov. 3, 2020, designating the United States, and also claims the benefit of International Application No. PCT/CN2019/124565, filed Dec. 11, 2019, the disclosures of which are incorporated herein by reference in their entirety.

TECHNICAL FIELD

The present disclosure relates to methods, communication device and communication equipment for enhancement of authentication, especially for enhancement of Digest Authentication and Key Agreement (AKA).

BACKGROUND

Digest Authentication and Key Agreement (AKA) is a procedure for authenticating a user equipment (UE) subscriber by combining both Digest scheme and 3GPP AKA authentication mechanism as specified by 3GPP TS 33.102 (V15.1.0). Digest AKA is not only used by HyperText Transfer Protocol (HTTP) but also used by the Session Initiation Protocol (SIP) and the Constrained Application Protocol (CoAP). The Digest AKA is widely used in IP Multimedia Subsystem (IMS) and in Generic Bootstrapping Architecture (GBA). The existing Digest AKA works well with 3G and 4G networks, but challenges exist when the current Digest AKA is deployed in 5G networks since the 5G AKA procedure is different from the AKA procedure used in 3G/4G networks.

SUMMARY

Some embodiments herein advantageously enable the existing applications (e.g., applications in IMS or GBA) that are using Digest AKA to work with 5G AKA.

More particularly, some embodiments include a method performed by a communication device (e.g., a User Equipment or UE). The method may comprise sending a first request to a communication equipment, wherein the first request comprises a communication device identifier of the communication device. The method may further comprise receiving a first response from the communication equipment, wherein the first response comprises one or more parameters. The method may further comprise generating a first key and a second key based on the received first response. The method may further comprise sending a second request to the communication equipment, wherein the second request comprises the first key and a message based on the second key. In some embodiments, the second key is a shared key between the communication device and communication equipment. In some embodiments, the first key may be based, at least in part, on the one or more parameters. In some embodiments, the message based on the second key is a Digest Authentication and Key Agreement (AKA) message. In some embodiments, the method may further comprise validating the first response received from the communication equipment.

Embodiments also include a communication device. The communication device comprises processing circuitry and memory. The memory contains instructions executable by the processing circuitry whereby the communication device is configured to send a first request to a communication equipment, wherein the first request comprises an identifier of the communication device. The communication device may further be configured to receive a first response from the communication equipment, wherein the first response comprises one or more parameters. The communication device may further be configured to generate a first key and a second key based on the received first response. The communication device may further be configured to send a second request to the communication equipment, wherein the second request comprises the first key and a message based on the second key. In some embodiments, the second key is a shared key between the communication device and the communication equipment. In some embodiments, the first key may be based, at least in part, on the one or more parameters. In some embodiments, the message based on the second key is a Digest Authentication and Key Agreement (AKA) message. In some embodiments, the communication device may further be configured to validate the first response received from the communication equipment.

Some embodiments include a computer program product. The computer program product comprises computer-readable instructions stored in a non-transitory computer-readable storage medium of the computer program product. When the instructions are executed by processing circuitry (e.g., at least one processor) of the communication device, they enable the communication device to perform one or more of the described communication device functionalities.

Some embodiments include a method performed by a communication equipment. The method may comprise receiving a first request from a communication device, wherein the first request comprises an identifier of the communication device. The method may further comprise sending a first response to the communication device, wherein the first response comprises one or more parameters. The method may further comprise receiving a second request from the communication device, wherein the second request comprises a first key and a message based on a second key. The method may further comprise sending a second response to the communication device, wherein the second response indicates a result of the validation of the second request. In some embodiments, the second key is a shared key between the communication device and the communication equipment. In some embodiments, the first key may be based, at least in part, on the one or more parameters. In some embodiments, the message based on the second key is a Digest Authentication and Key Agreement (AKA) message. In some embodiments, the method may further comprise validating the first key and validating the message based on the second key.

Some embodiments include a communication equipment. The communication equipment comprises processing circuitry and memory. The memory contains instructions executable by the processing circuitry whereby the communication device is configured to receive a first request from a communication device, wherein the first request comprises an identifier of the communication device. The communication equipment may further be configured to send a first response to the communication device, wherein the first response comprises one or more parameters. The communication equipment may further be configured to receive a second request from the communication device, wherein the second request comprises a first key and a message based on a second key. The communication equipment may further be configured to send a second response to the communication device, wherein the second response indicates a result of the validation of the second request. In some embodiments, the second key is a shared key between the communication device and the communication equipment. In some embodiments, the first key may be based, at least in part, on the one or more parameters. In some embodiments, the message based on the second key is a Digest Authentication and Key Agreement (AKA) message. In some embodiments, the communication equipment may further be configured to validate the first key and validate the message based on the second key.

Some embodiments include a computer program product. The computer program product comprises computer-readable instructions stored in a non-transitory computer-readable storage medium of the computer program product. When the instructions are executed by processing circuitry (e.g., at least one processor) of the communication equipment, they enable the communication equipment to perform one or more of the described communication device functionalities.

Embodiments also include corresponding, computer programs, and carriers. A computer program comprises instructions which, when executed on at least one processor of a communication device or a communication equipment, cause the communication device or a communication equipment to carry out any of the embodiments described above. Embodiments further include a carrier containing such a computer program. This carrier may comprise one of an electronic signal, optical signal, radio signal, or computer readable storage medium.

For some of the embodiments above, only a few changes may be needed on the UE side and in the authentication application program interface (API). No change may be needed for the existing applications that rely on Digest AKA procedure or the 5G AKA procedure on the core network side. For some of the embodiments above, they may be used in other networks beside 5G, such as 6G or further generation 3GPP networks in future.

BRIEF DESCRIPTION OF THE DRAWINGS

Exemplary embodiments will be described, by way of example, with reference to the accompanying drawings, in which.

DETAILED DESCRIPTION

Figure 1:
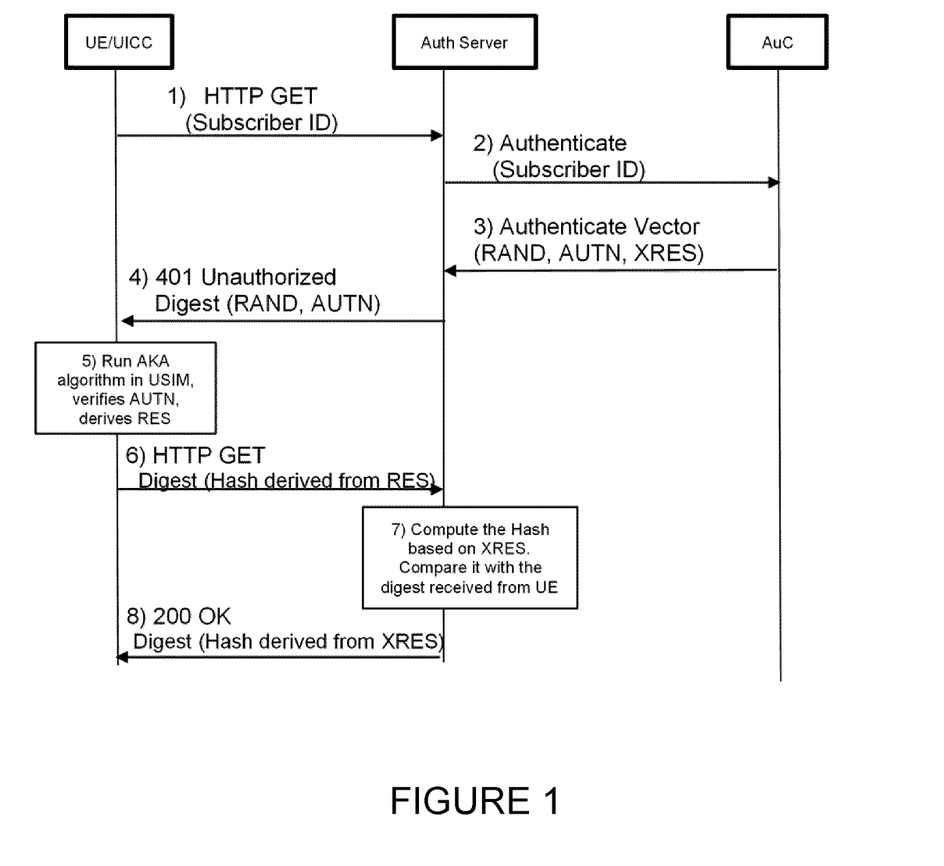
FIG. 1 is a signalling diagram of the HTTP Digest AKA procedure.

FIG. 1 shows an existing HTTP Digest AKA procedure. HTTP Digest AKA, as defined in RFC3310, is a procedure for authenticating a UE subscriber by combining both the HTTP Digest authentication scheme defined in RFC2617 and the 3GPP AKA authentication mechanism specified in 3GPP TS 33.102 (V15.1.0). The basic idea of HTTP Digest AKA is to map the AKA parameters onto the HTTP Digest challenge-response authentication procedure. As is shown in FIG. 1:

1) UE sends an initial request (e.g., an HTTP GET message) which includes an identifier of the subscriber, e.g., a Mobile Station International Subscriber Directory Number (MSISDN) or an International Mobile Subscriber Identity (IMSI) to an authentication server (referred to as Auth Server in FIG. 1).

2) When the Auth Server, which could be a Proxy-Call Session Control Function (P-CSCF) used in IP Multimedia Subsystem (IMS) or a Bootstrapping Server Function (BSF) used in Generic Bootstrapping Architecture (GBA), receives the initial request, it initiates an authentication request to the Authentication Center (AuC) with the subscriber identifier.

3) The AuC replies with an authentication vector which comprises of an Authentication Token (AUTN), a Random Challenge (RAND) and an Expected Authentication Response (XRES) to the Auth Server.

4) After obtaining the authentication vector, the Auth Server populates the RAND and AUTN into a 401 Unauthorized response and sends the response to UE.

5) UE passes the received RAND and AUTN to its Universal Integrated Circuit Card (UICC). UICC runs the pre-shared key and algorithm in the Subscriber Identity Module (USIM) to verify the AUTN. If successful, the UE can authenticate the network side. UICC also derives the Authentication Response (RES) and key materials. UE receives the RES from the UICC and generates a Digest based on a hash of the RES and other parameters.

6) UE sends the generated Digest to the Auth Server in another request.

7) The Auth Server uses the same hash algorithm to compute a hash based on XRES received from the AuC. This hash is compared with the Digest received from UE. If they are equivalent, the network can authenticate the UE as well.

8) For the purpose of mutual authentication and message integrity, the server calculates a hash based on XRES and other parameters, such as the content of the received request message. The hash is populated into a 200 OK response. The UE can also verify the received hash against the hash calculated locally.

This Digest AKA procedure is not only used by HTTP but also by Session Initiation Protocol (SIP) and Constrained Application Protocol (CoAP). For the example of using Digest AKA on SIP, please refer to RFC 3310. For the example of using Digest AKA on CoAP, please refer to RFC 7252. The Digest AKA has been widely used in IMS (see 3GPP TS 29.228 (V15.2.0)) and GBA (see 3GPP TS 33.220 (V15.4.0)).

Figure 2:
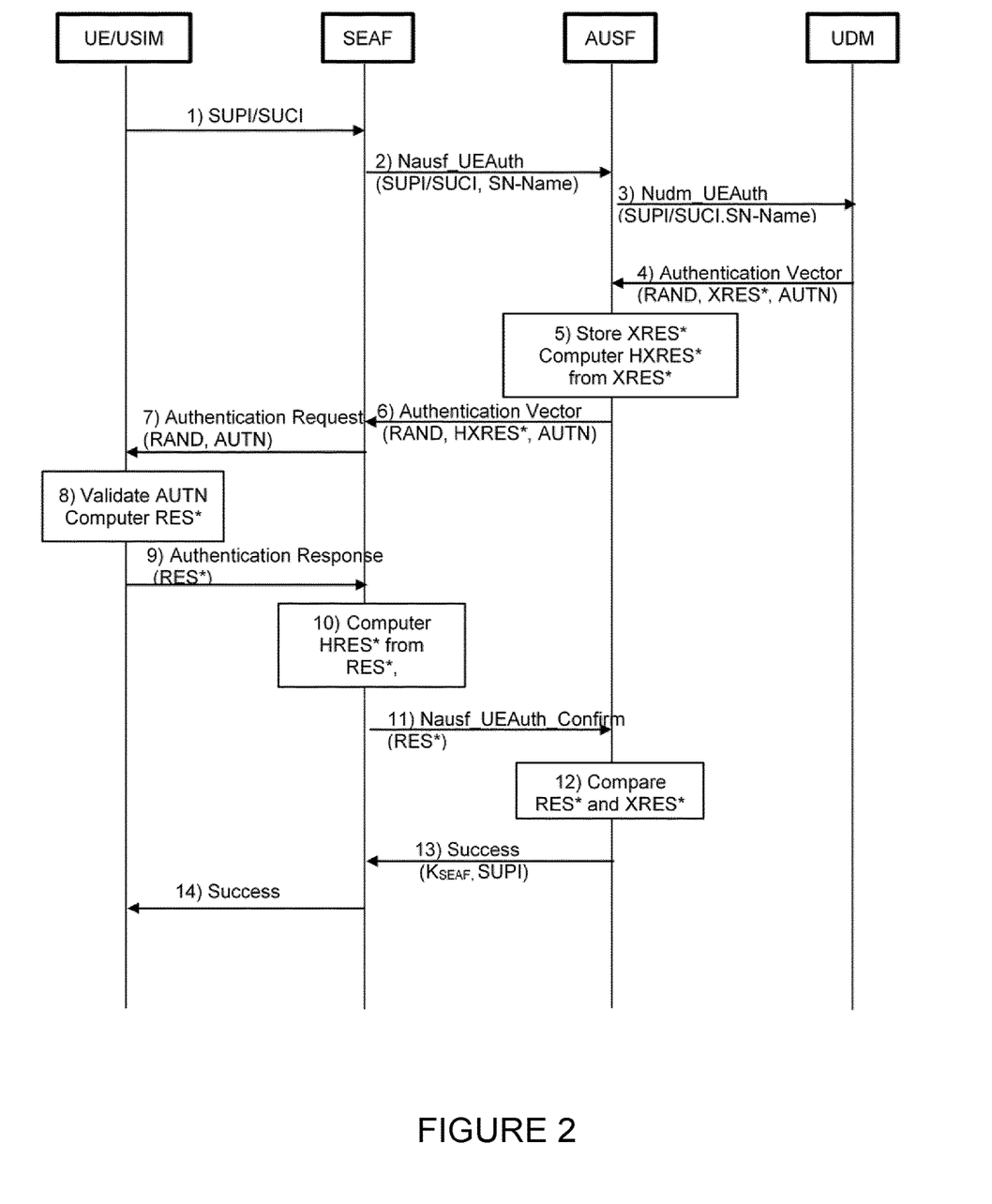
FIG. 2 is a signalling diagram of the 5G AKA authentication procedure.

FIG. 2 shows an 5G AKA authentication procedure, which is used to replace the existing AKA mechanism used in 3G and 4G networks. As shown in FIG. 2:

1) The UE initiates an authentication procedure by sending an Authentication Request with a subscriber identifier, such as Subscriber Permanent Identity (SUPI) or Subscriber Concealed Identity (SUCI) which is an encrypted SUPI, to a Security Anchor Function (SEAF).

2) The SEAF then calls the Authentication Server Function (AUSF) by sending an Nausf_UEAuthentication request which comprises the received subscriber identifier and the serving network name.

3) The AUSF then sends an Nudm_UEAuthentication request including the received subscriber identifier and serving network name to the Unified Data Management (UDM).

4) The UDM sends back an Authentication Vector which comprises an Authentication Token (AUTN), a Random Challenge (RAND) and an Expected Authentication Response (XRES*) to the AUSF.

5) The AUSF stores the XRES* and computes a hash value of the Expected Authentication Response (HXRES*) from the received XRES*.

6) The AUSF then sends an Authentication Vector which comprises of the AUTN, the RAND and the HXRES* to the SEAF.

7) The SEAF sends an Authentication Request which comprises the AUTN and RAND to the UE.

8) The UE receives the Authentication Request and validates the received AUTN. UE also calculates a RES* using the RAND and a pre-shared key.

9) The UE then sends the calculated RES* included in an Authentication Response to the SEAF.

10-11) The SEAF validates the RES* received from UE by hashing and comparing the hash of the RES* received from UE with the HXRES* received from AUSF. If they match, the UE is successfully authenticated in the serving network. But the SEAF continues to authenticate the UE with the home network. Hence, the SEAF sends the RES* received from the UE to the AUSF.

12-13) The AUSF compares the RES* received from UE with the XRES* received from the UDM is step 4. If they match, the UE is successfully authenticated in the home network. The AUSF then sends an Authentication Success Response including $K_{SEAF}$ and the SUPI to the SEAF.

14) The SEAF sends the Authentication Success Response to UE.

For more details about 5G AKA, please refer to 3GPP TS 33.501 (V15.5.0). Compared to the 3G or 4G AKA, in the 5G AKA, the difference is mainly on the network side. In the current Digest AKA procedure as shown in FIG. 1, the RES calculated by UE is never sent over the network because the UE is assumed to know the RES and the Auth Server is assumed to know the XRES. Thus, the UE only computes a Digest by hashing the RES and other parameters. The Auth Server side uses XRES and the same parameters known by UE to compute a hash value and compare it with the received Digest. However, in the 5G AKA procedure described above and shown in FIG. 2, the SEAF doesn't know XRES* during the authentication procedure. Hence, the UE needs to send the RES* to the SEAF and the SEAF has to hash it to HRES* and compare it with the HXRES* received from the AUSF. Therefore, the current Digest AKA authentication cannot work with 5G.

Figure 3:
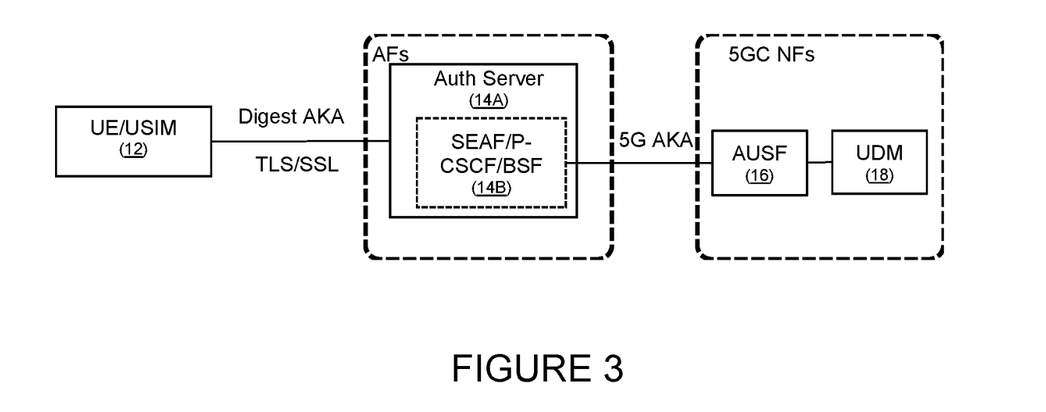
FIG. 3 is an architecture of an enhanced AKA according to some embodiments.

FIG. 3 shows an example of an architecture in which an enhanced Digest AKA can be used with 5G AKA. With the enhanced Digest AKA, the UE can securely transmit the RES* to the server. Meanwhile, the enhanced Digest AKA procedure is still compatible with existing Digest AKA authentication mechanism and the 5G AKA authentication mechanism. As shown in FIG. 3, the Auth Server can be one of Application Functions (AFs) deployed in or connected to 5G core network (5GC). The Auth Server 14A comprises two interfaces. The first interface facing the UE supports the Digest AKA procedure based on HTTP, SIP, or CoAP. The second interface facing the AUSF 16 in 5GC network supports 5G AKA procedure. Thus, the Auth Server 14A can use the Nausf_UEauthentication service provided by the AUSF 16. In one of the embodiments, the second interface may be supported by a SEAF 14B. The SEAF 14B may be embedded within the Auth Server 14A (as shown in FIG. 3) or independent from the Auth Server 14A but connected to the Auth Server 14A (not shown in the figure). In another embodiment, the second interface may be supported by a Proxy-Call Session Control Function (P-CSCF) 14B, by a Bootstrapping Server Function (BSF) 14B, or by another network function. Either of the network functions may be embedded within the Auth Server 14A or independent from the Auth Server 14A but connected to the Auth Server 14A.

Further, in some embodiments, a security protocol (e.g., Transport Layer Security (TLS), Secure Sockets Layer (SSL) protocol, etc.) may be used to protect the interface between the UE and the Auth Server. In embodiments where the UE does not or cannot support any security protocols, e.g, TLS or SSL, for instance, for some constrained Internet of Things (IoT) devices, an alternative approach that allows transferring the RES* in secured ways will be provides in the later embodiment.

Figure 4:
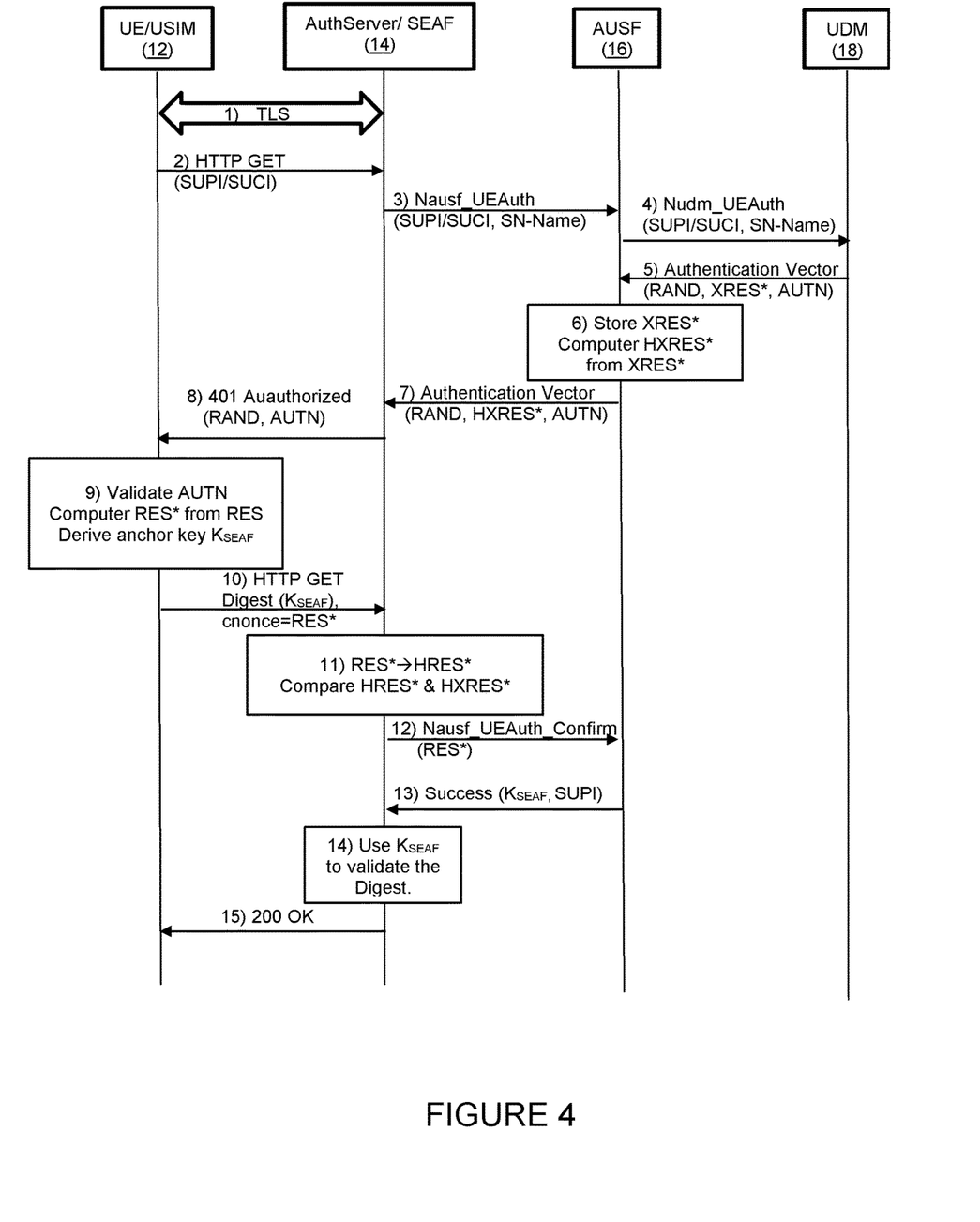
FIG. 4 is a signaling diagram of an enhanced AKA Digest procedure according to some embodiments.

FIG. 4 shows one of the embodiments of the enhanced Digest AKA procedure integrated with 5GC where TLS is used to protect the security of the interface between the UE 12 and the Auth Server/SEAF 14. In some other embodiments, TLS maybe replaced by another security protocol (e.g., SSL protocol) to protect the interface between the UE and the Auth Server. In FIG. 4, HTTP is used as an example. In some other embodiments, HTTP may be replaced by another transfer protocol (e.g., SIP or CoAP) to transfer the data. The Auth Server 14A and the SEAF 14B may be collocated or separated from each other but could communicate with each other. The SEAF 14B could be replaced by a Proxy-Call Session Control Function (P-CSCF) 14B, by a Bootstrapping Server Function (BSF) 14B, or by another network function.

1) The UE establishes a TLS connection with the Auth Server 14 A, so that the following communication are protected by a secured connection.

2) The UE sends an HTTP GET request with the UE's subscriber identifier. The subscriber identifier could be one or more of a Subscriber Permanent Identity (SUPI), a Subscriber Conceal Identity (SUCI), a Mobile Station International Subscriber Directory Number (MSISDN), an International Mobile Subscriber Identity (IMSI), an External ID, or any other subscriber identifier of the UE 12.

An example of an HTTP GET message is shown as below:

```
GET / HTTP/1.1 Host: bsf.home1.net:80
User-Agent: Bootstrapping Client Agent; Release-6
Date: Thu, 08 Jan 2004 10:13:17 GMT
Accept: */*
Authorization:Digest username="<SUPI/SUCI", realm="<serving
network name>", nonce="", uri="/", response=""
```

3) When the Auth Server/SEAF 14 receives the request (the subscriber identifier is passed to the SEAF 14B if the SEAF 14B is separated from the Auth Server), the SEAF 14B sends an Nausf_UEAuthentication message comprising the subscriber identifier and the Serving Network Name to the AUSF 16.

4) The AUSF 16 sends an Nudm_UEAuthentication message to UDM 18, the Nudm_UEAuthentication message including the received subscriber identifier and Serving Network Name.

5) The UDM 18 responds to the AUSF 16 with an Authentication Vector including RAND, XRES*, and AUTN.

6) The AUSF 16 stores the XRES* and computes a hash value of the XRES* (HXRES*) from the received XRES*.

7) The AUSF 16 sends an Authentication Vector including the received RAND, AUTN and computed HXRES* to the Auth Server/SEAF 14.

8) The Auth Server/SEAF 14 populates the RAND and AUTN into an HTTP 401 Unauthorized Response and sends it to UE 12.

An example of an HTTP 401 Unauthorized Response message is shown as below:

```
HTTP/1.1 401 Unauthorized
Server: Bootstrapping Server; Release-6
Date: Thu, 08 Jan 2004 10:13:17 GMT
WWW-Authenticate: Digest realm="<serving network name>",
nonce=
base64(RAND + AUTN + server specific data), algorithm=AKAv1-
MD5,
qop="auth-int", opaque="5ccc069c403ebaf9f0171e9517f30e41"
```

9) The UE 12 passes the AUTN and RAND to its Universal Integrated Circuit Card (UICC). After the UICC successfully validates the received AUTN, it generates RES, and derives RES* from RES. The UE 12 continues to derive an anchor key $K_{SEAF}$.

10) The UE 12 sends the RES* to the Auth Server/SEAF 14 in the directive "cnonce" after encoding it with base64. The anchor key $K_{SEAF}$ is used as the "password" parameter (shared key) for calculating the Digest response as described by RFC3310 and RFC2617.

An example of the second HTTP GET message including RES* and the Digest is shown as below:

```
GET / HTTP/1.1 Host: bsf.home1.net:80
User-Agent: Bootstrapping Client Agent; Release-6; 3gpp-gba-tmpi
Date: Thu, 08 Jan 2004 10:13:18 GMT
Accept: */*
Authorization: Digest username="<supi/suci>",
   realm="<serving network name>",
   nonce="base64(RAND + AUTN + server specific
data)",
   uri="/",
   qop=auth-int,
   nc=00000001,
   cnonce="base64(RES*) " ,
   response= "Digest (password=K_SEAF, ...) ",
   opaque="5ccc069c403ebaf9f0171e9517f30e41",
   alaorithm=AKAv1-MD5
```

Compared to the current Digest AKA procedure shown in FIG. 2, in the enhanced AKA procedure shown in FIG. 4, since the Auth Server/SEAF doesn't know XRES* during the authentication procedure, the UE needs to send the RES* to the Auth Server/SEAF. Thus, RES* cannot be used as a shared key between the UE and the Auth Server/SEAF as is done in the current Digest AKA. Therefore, a new key needs to be used as a shared key between the UE and the Auth Server/SEAF. In some embodiments, anchor key $K_{SEAF}$ is used as the shared key because both the UE and the Auth Server/SEAF can obtain $K_{SEAF}$ without changing the existing 5G AKA procedure. Furthermore, when anchor key $K_{SEAF}$ is used as the shared key, only the UE side and the authentication application program interface (API) facing to UE side need to be changed. On the network side, no change is needed for the current 5G AKA procedure. Even if the SEAF is replaced with a P-CSCF or a BSF, when the P-CSCF or the BSF works with a 5G network, they can obtain the same key without changing the existing 5G AKA procedure.

11-12) The Auth Server/SEAF 14 retrieves RES* from the cnonce directive. The SEAF 14B which may be embedded in the Auth Server 14A hashes the RES* to HRES* as specified by Annex A.5 of 3GPP TS 33.501 (V15.5.0). The HRES* is compared with HXRES* included in the Authentication Vector which is received from the AUSF. If they match, the Auth Server/SEAF 14 sends the RES* to the AUSF in a Nausf_UEAuth_Confirm message.

13) The AUSF 16 checks if the RES* received from the SEAF 14B matches the stored XRES* which the AUSF 16 received from the UDM 18 in step 5. If so, the AUSF 16 confirms the authentication with the anchor key $K_{SEAF}$, and sends it back to the SEAF 14B which may be embedded in the Auth Server 14A in a Nausf_UEAuthetication_Authetication Response message as specified by TS 33.501 (V15.5.0).

14) The Auth Server 14A obtains the anchor key $K_{SEAF}$ from SEAF 14B, uses it as the "password" parameter (shared key) in generation of the server-side digest for purpose of server authentication as specified by RFC 3310.

15) If the Digest validation is successful, the Auth Server returns a 200 OK response to the UE 12 as described in RFC3310 and RFC2617.

An example of sending a HTTP 200 OK response is shown as below:

```
HTTP/1.1 200 OK
   Server: Bootstrapping Server; Release-6; 3gpp-gba-tmpi
   Authentication-Info: qop=auth-int,
rspauth="6629fae49394a05397450978507c4ef1",
   cnonce="6629fae49393a05397450978507c4ef1",
nc=00000001, nextnonce="base64(RAND + AUTN + server specific
data)"
Date: Expires: Thu, 08 Jan 2004 10:23:17 GMT
Content-Type: application/vnd.3gpp.bsf+xml
Content-Length: (...)
```

Figure 5:
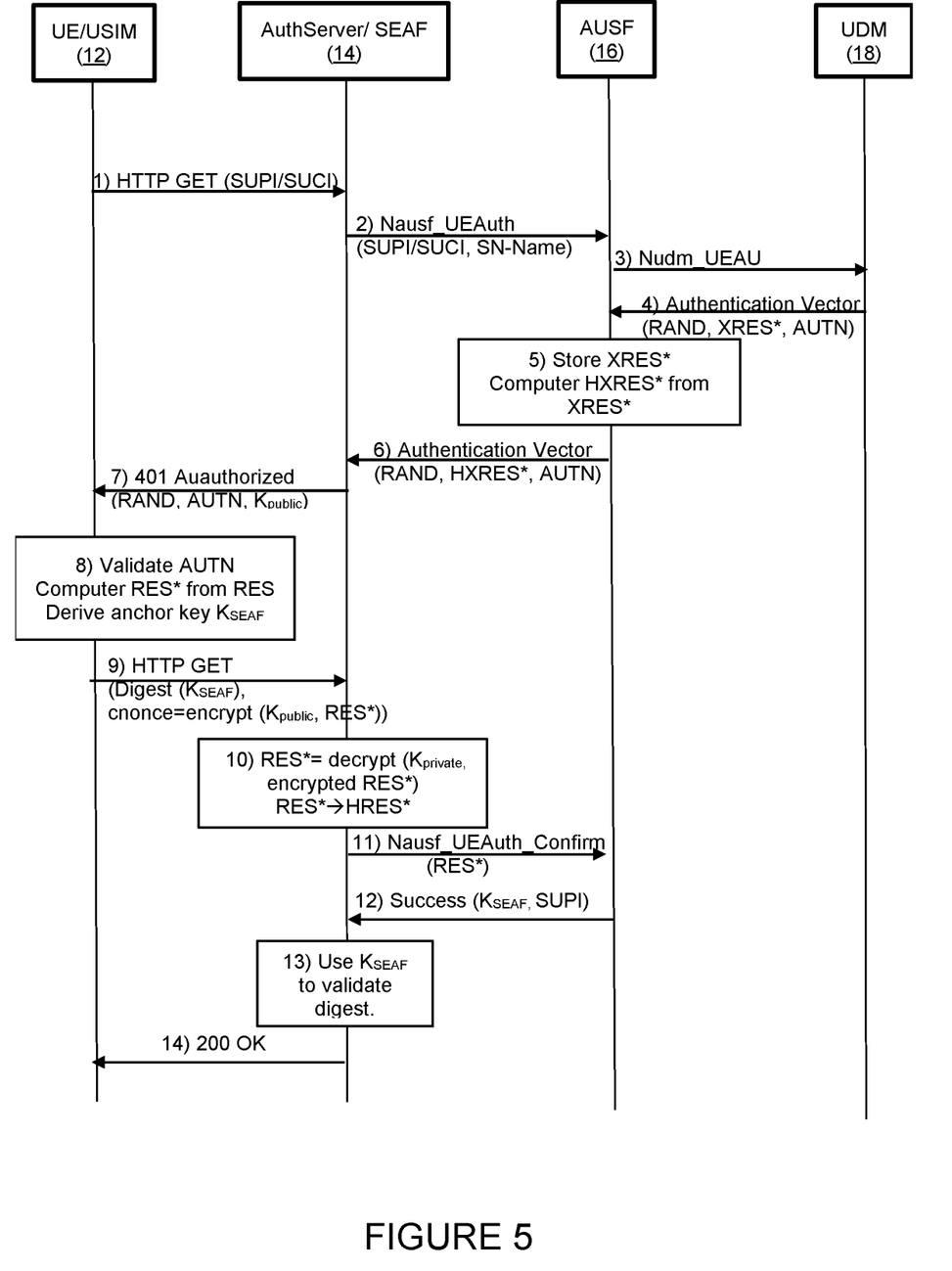
FIG. 5 is a signalling diagram of another enhanced AKA Digest procedure according to some other embodiments.

FIG. 5 shows an embodiment of the enhanced AKA Digest procedure where no security protocol (e.g., TLS or SSL) is available for the interface between the UE 12 and the Auth Server 14A. For instance, the UE 12 may be a constrained IoT device that cannot support TLS/SSL, or TLS/SSL may not be strong enough due, for instance, to a lack of hardware random number generator. HTTP is also used in FIG. 5 as an example. In some other embodiments however, another transfer protocol, e.g., Session Initiation Protocol (SIP) or Constrained Application Protocol (CoAP), may be used to transfer the data. The Auth Server 14A and SEAF 14B may be collocated or separated from each other but could communicate with each other. In some embodiments, the SEAF 14B could be replaced by a Proxy-Call Session Control Function (P-CSCF) 14B, by a Bootstrapping Server Function (BSF) 14B, or by another network function.

Compared with the enhanced AKA Digest procedure shown in FIG. 4, the main difference of the AKA Digest procedure shown in FIG. 5 is that a key pair including a public key and a private key is used to protect the RES* computed by UE 12. The detailed differences are listed as below:

There is no security protocol used to protect the interface between the UE 12 and the Auth Server 14A in step 1.

In step 7, the Auth Server/SEAF 14 includes a public key of a key pair of which the private key ($K_{private}$) is stored within the Auth Server/SEAF 14 itself. The public key ($K_{public}$) is populated in the directive of "nonce" as RFC 3310, the nonce directive comprises RAND, AUTN and server data that are appended by server-side. The public key is populated in the part of server data.

In step 9, the UE 12 uses the public key to encrypt the RES*. After UE encoded the RES* with Base64, the encrypted RES* is populated in the "cnonce" directive and sent to the Auth Server/SEAF 14.

In step 10, the Auth Server 14A uses the private key corresponding to the public key to decrypt the RES* and passes the RES* to the SEAF 14B which may be embedded in or connected to the Auth Server.

Figure 6:
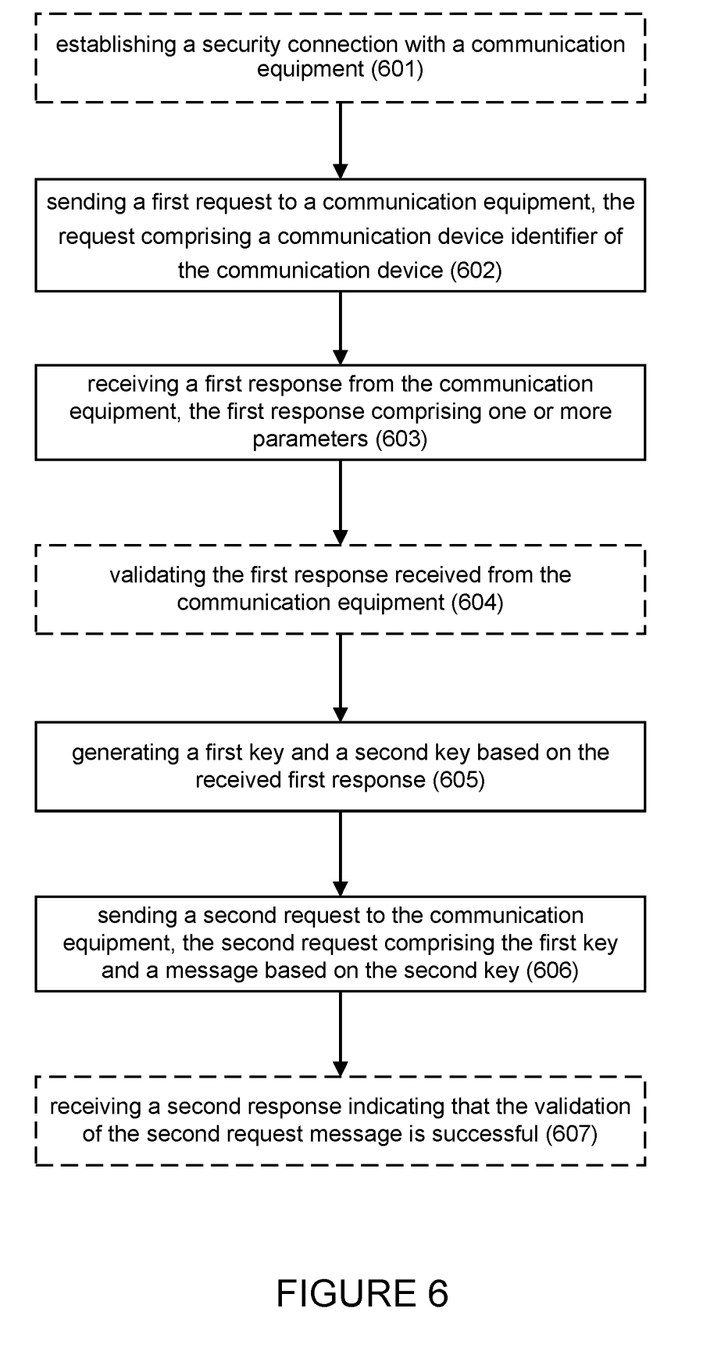
FIG. 6 is a logic flow diagram of a method performed by a communication device according to some embodiments.

FIG. 6 depicts a method 600 performed by a communication device (e.g., a wireless device, such as a user equipment, UE) according to particular embodiments. Blocks in dashed lines are optional. The method in some embodiments may include sending a first request (e.g., HTTP GET, SIP REGISTER or CoAP GET) to a communication equipment, the request comprising an identifier of the communication device (e.g., SUPI, SUCI, IMSI, MSISDN, an external ID, etc.) (block 602). In some embodiments, the communication equipment may comprise an Authentication Server. In some embodiments, the communication equipment implements a Proxy-Call Session Control Function (P-CSCF), a Bootstrapping Server Function (BSF), or a Security Anchor Function (SEAF). The method in some embodiments may also include receiving a first response from the communication equipment, the first response comprising one or more parameters (e.g., RAND, AUTN, etc.) (block 603). The method in some embodiments may further include generating a first key and a second key based on the received first response (block 605). In some embodiments, the first key is based, at least in part, on the one or more parameters. In some embodiments, the first key is a value of authentication response (RES*). In some embodiments, the second key is a shared key between the communication device and the communication equipment (e.g., $K_{SEAF}$). The method in some embodiments may also include sending a second request to the communication equipment, the second request comprising the first key and a message based on the second key (block 606). In some embodiments, the message based on the second key is a Digest Authentication and Key Agreement (AKA) message.

The method in some embodiments also include validating the first response received from the communication equipment (block 604). In some embodiments, the method may also include receiving a second response (e.g., HTTP, SIP or CoAP success response) indicating that the validation of the second request message is successful (block 607).

The method in some embodiments may also include establishing an encrypted or otherwise secured connection with a communication equipment (block 601) before sending the first request (block 602). In some embodiments, the encrypted connection is based on the Transport Layer Security (TLS) protocol or on the Secure Sockets Layer (SSL) protocol. In some embodiments, the method may include encrypting the first key using a fourth key ($K_{public}$) (not shown in FIG. 6) when sending the second request comprising the first key (block 606).

Figure 7:
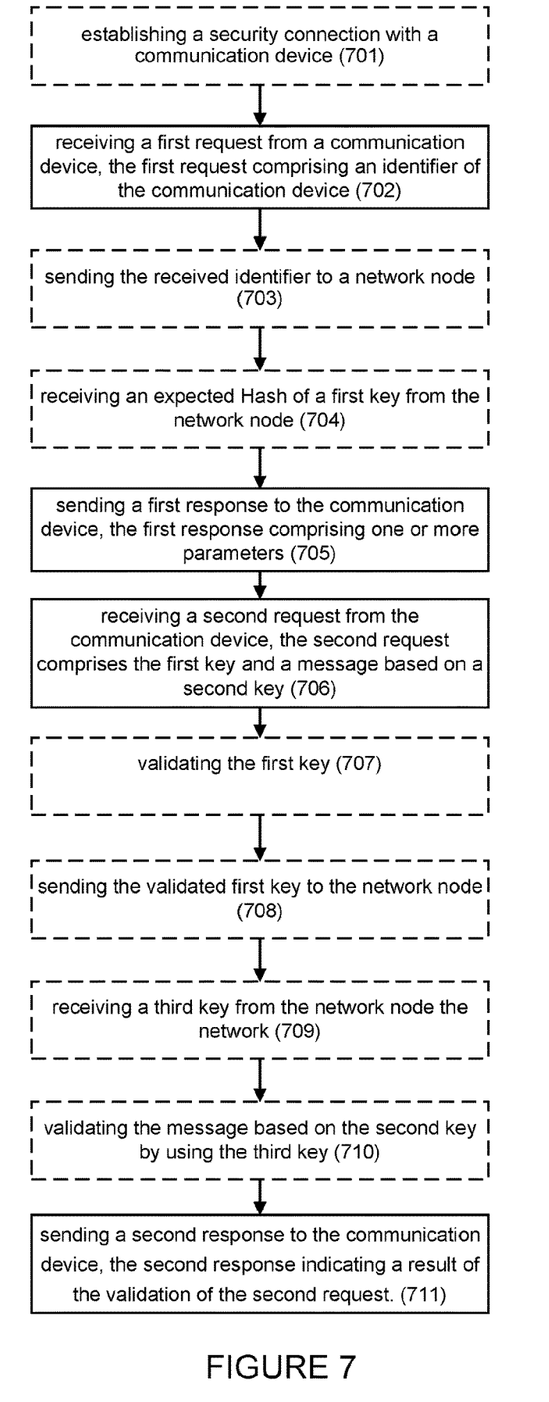
FIG. 7 is a logic flow diagram of a method performed by a communication equipment according to some embodiments.

FIG. 7 depicts a method 700 performed by a communication equipment (e.g., a SEAF, a P-CSCF, a BSF, etc.) according to particular embodiments. Blocks in dashed lines are optional. The method in some embodiments may include receiving a first request from a communication device (e.g., a wireless device, such as a user equipment, UE), the first request comprising an identity of the communication device (e.g., SUPI, SUCI, IMSI, MSISDN, an external ID, etc.) (block 702). In some embodiments, the communication equipment comprises an Authentication Server. In some embodiments, the first request is a HTTP GET, a SIP REGISTER or a CoAP GET message. The method in some embodiments may also include sending a first response to the communication device, the first response comprising one or more parameters (e.g., RAND, AUTN, etc.) (block 705). The method in some embodiments may also include receiving a second request from the communication device, the second request comprises a first key and a message based on a second key (block 706). In some embodiments, the first key is based, at least in part, on the one or more parameters. In some embodiments, the first key is a value of authentication response (RES*). In some embodiments, the second key is a shared key between the communication device and the communication equipment (e.g., $K_{SEAF}$) In some embodiments, the message based on the second key is a Digest Authentication and Key Agreement (AKA) message. The method in some embodiments may further include sending a second response (e.g., HTTP, SIP or CoAP success response) to the communication device, the second response indicating a result of the validation of the second request (block 711).

In some embodiments, the method may also include validating the first key (block 707). In some embodiments, validating the first key comprises computing a hash of the first key and comparing the computed hash of the first key with an expected hash of the first key. In some embodiments, the first key is a value of an authentication response (RES*), the hash of the first key is a hash value of the authentication response (HRES*) and the expected hash of the first key is an expected hash value of the authentication response (HXRES*). In some embodiments, the method may also include validating the message based on a second key (block 710). In some embodiments, validating the message based on the second key comprises validating the message using a third key received from a network node (e.g., AUSF). In some embodiments, the third key is a shared key (e.g., $K_{SEAF}$) between the communication device and communication equipment.

In some embodiments, the method may also include sending the communication device identifier received from the communication device to a network node (e.g., AUSF) (block 703). In some embodiments, the method may also include receiving an expected hash of the first key from the network node (e.g., AUSF) (block 704). In some embodiments, the method may also include sending the validated first key to the network node (e.g., AUSF) (block 708). In some embodiments, the method may also include receiving a third key from the network node (e.g., AUSF) (block 709).

The method in some embodiments may include establishing an encrypted or otherwise secured connection with a communication equipment (block 701) before receiving the first request (block 702). In some embodiments, the encrypted connection is based on the Transport Layer Security (TLS) protocol or on the Secure Sockets Layer (SSL) protocol. The method in the other embodiments may include that, when receiving the first key (block 706), the first key is encrypted by the communication device using a fourth key (e.g., $K_{public}$, not shown in FIG. 7), and when validating the first key (block 707), decrypting the first key using a fifth key (e.g., $K_{private}$, not shown in FIG. 7).

Figure 8:
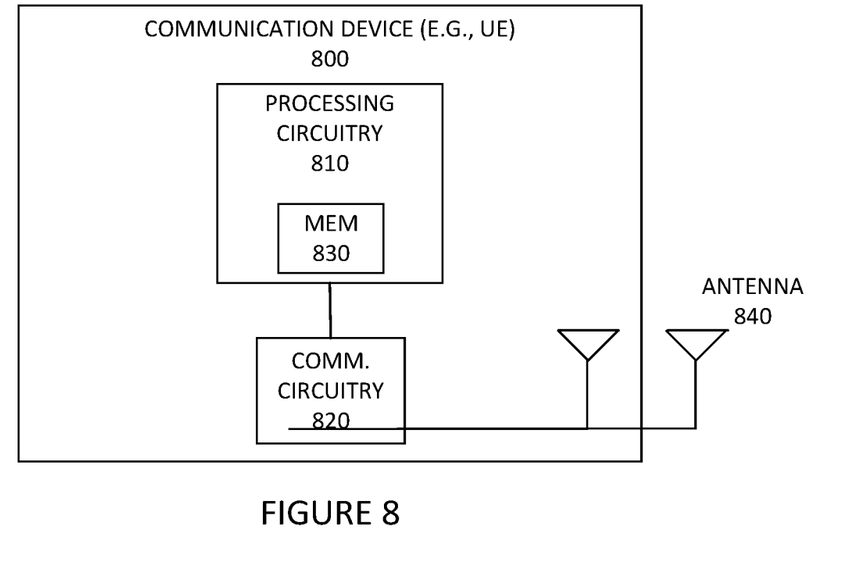
FIG. 8 is a block diagram of a communication device according to some embodiments.

FIG. 8 illustrates a communication device 800 (e.g., wireless device, UE) as implemented in accordance with one or more embodiments. As shown, the communication device 800 includes processing circuitry 810 and communication circuitry 820. The communication circuitry 820 (e.g., radio circuitry) is configured to transmit and/or receive information to and/or from one or more other nodes, e.g., via any communication technology. Such communication may occur via one or more antennas 840 that are either internal or external to the communication device 800. The processing circuitry 810 is configured to perform processing described above (e.g., in FIG. 6), such as by executing instructions stored in memory 830. The processing circuitry 810 in this regard may implement certain functional means, units, or modules.

Figure 9:
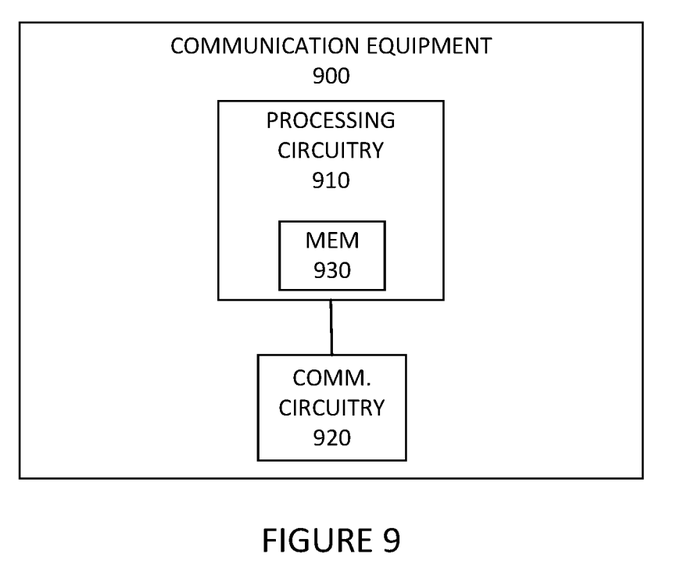
FIG. 9 is a block diagram of a communication equipment according to some embodiments.

FIG. 9 illustrates communication equipment 900 configured for communicating with a communication device as implemented in accordance with one or more embodiments. As shown, the communication equipment 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above (e.g., in FIG. 7), such as by executing instructions stored in memory 930. The processing circuitry 910 in this regard may implement certain functional means, units, or modules.

A computer program comprises instructions which, when executed on at least one processor of a communication device or communication equipment, cause the communication device or communication equipment to carry out any of the respective processing described above. A computer program in this regard may comprise one or more code modules configured to perform one or more steps of the processing described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a communication device or a communication equipment, cause the communication device or communication equipment to perform as described above. Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

The invention claimed is:

1. A method performed by a communication device, the method comprising:
    sending a first request to a communication equipment, the request comprising an identifier of the communication device;
    receiving a first response from the communication equipment, the first response comprising one or more parameters;
    generating a first key and a second key based on the received first response; and
    sending a second request to the communication equipment, the second request comprising the first key and a message based on the second key.

2. The method according to claim 1, wherein the second key is a shared key between the communication device and communication equipment.

3. The method according to claim 1, wherein the second key is KSEAF.

4. The method according to claim 1, wherein the first key is based, at least in part, on the one or more parameters.

5. The method according to claim 4, wherein the first key is a value of authentication response (RES*).

6. The method according to claim 1, wherein the one or more parameters comprise a random challenge (RAND) and an Authentication Token (AUTN).

7. The method according to claim 1 wherein the method further comprises validating the first response received from the communication equipment.

8. The method according to claim 1 wherein the message based on the second key is a Digest Authentication and Key Agreement (AKA) message.

9. A method performed by a communication equipment, the method comprising:
    receiving a first request from a communication device, the first request comprising an identifier of the communication device;
    sending a first response to the communication device, the first response comprising one or more parameters;
    receiving a second request from the communication device, the second request comprises a first key and a message based on a second key; and
    sending a second response to the communication device, the second response indicating a result of a validation of the second request.

10. The method according to claim 9, the method further comprising:
    validating the first key; and
    validating the message based on the second key.

11. The method according to claim 9, wherein the second key is a shared key between the communication device and communication equipment.

12. The method according to claim 11, wherein the shared key is KSEAF.

13. The method according to claim 9, wherein the message based on the second key is a Digest Authentication and Key Agreement (AKA) message.

14. The method according to claim 9, wherein the first request comprises a random challenge (RAND) and an Authentication Token (AUTN).

15. The method according to claim 10, wherein validating the first key comprises computing a hash of the first key and comparing the computed hash of the first key with an expected hash of the first key.

16. The method according to claim 9, wherein the first key is based, at least in part, on the one or more parameters.

17. The method according to claim 14, wherein the first key is a value of an authentication response (RES*), the hash of the first key is a hash value of the authentication response (HRES) and the expected hash of the first key is an expected hash value of the authentication response (HXRES*).

18. The method according to claim 10, wherein validating the message based on the second key comprises validating the message using a third key received from a network node.

19. A communication device comprising:
    processing circuitry and memory, the memory containing instructions executable by the processing circuitry whereby the communication device is configured to:
        send a first request to a communication equipment, the request comprising an identifier of the communication device;

receive a first response from the communication equipment, the first response comprising one or more parameters;

generate a first key and a second key based on the received first response; and send a second request to the communication equipment, the second request comprising the first key and a message based on the second key.

20. A communication equipment comprising:

processing circuitry and memory, the memory containing instructions executable by the processing circuitry whereby the communication equipment is configured to:

receive a first request from a communication device, the first request comprising an identifier of the communication device;

send a first response to the communication device, the first response comprising one or more parameters;

receive a second request from the communication device, the second request comprises a first key and a message based on a second key; and send a second response to the communication device, the second response indicating a result of a validation of the second request.

* * * * *